United States Patent Office 3,195,679
Patented July 20, 1965

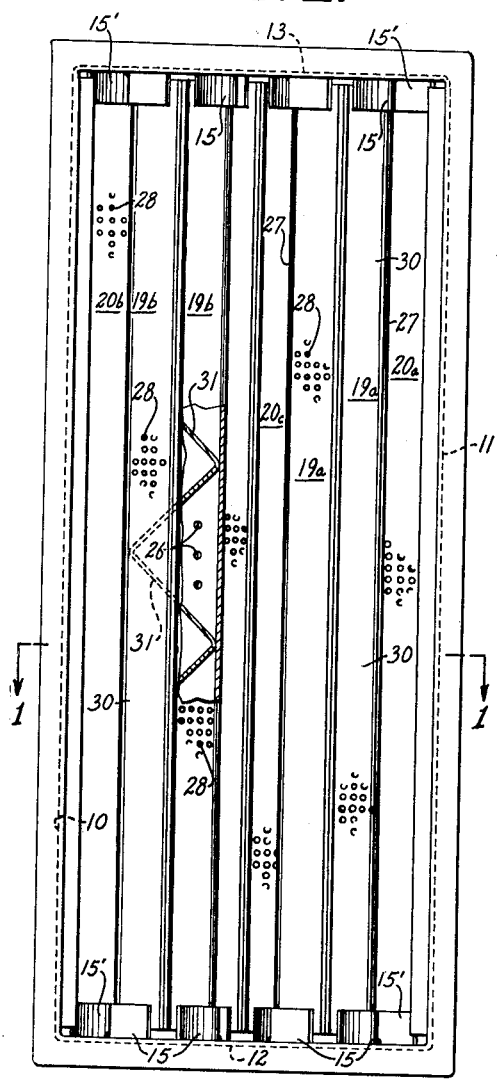

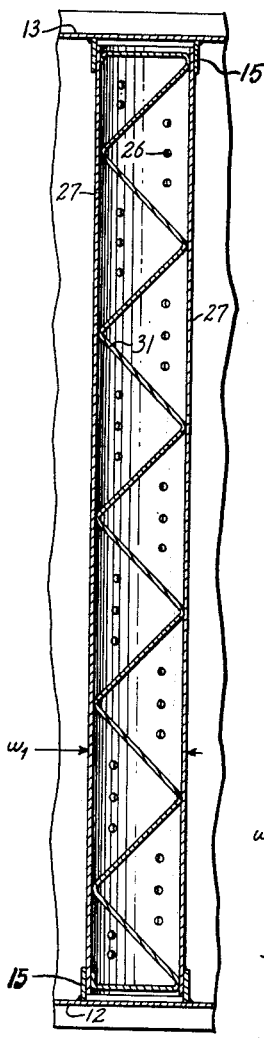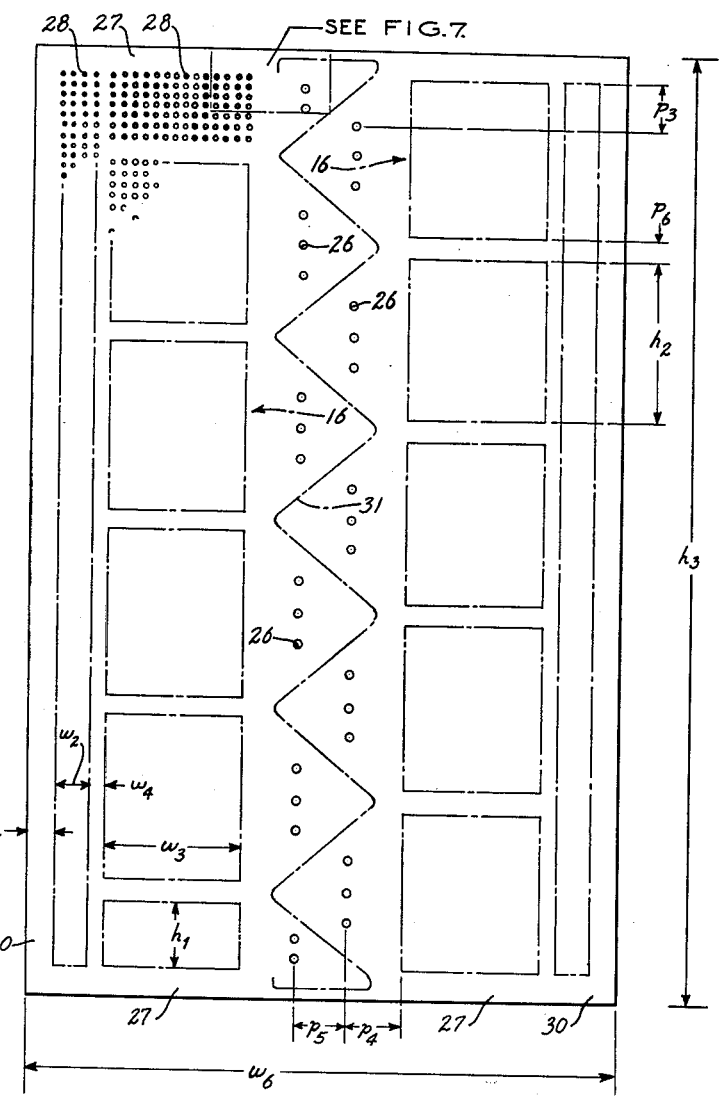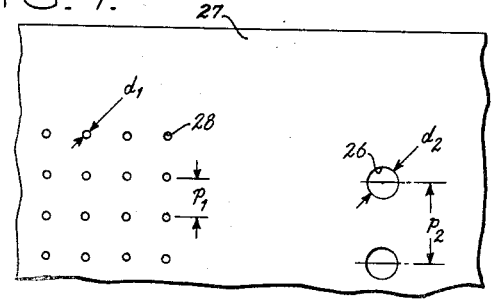

3,195,679
SOUND ATTENUATOR AND METHOD OF PRODUCING SAME
John Duda, Dumont, N.J., Uno Ingard, South Lincoln, Mass., and Frederic M. Oran, Riverdale, N.Y., assignors to Industrial Acoustics Company, Inc., New York, N.Y., a corporation of New York
Filed Feb. 8, 1961, Ser. No. 87,953
11 Claims. (Cl. 181—56)

This invention relates to sound attenuating apparatus and more particularly to apparatus for attenuating sound associated with fluid flow.

Of the diverse techniques and structures employed for sound attenuation, one of the most common employs sound absorbent fibrous or granular material including glass fiber, asbestos, metal wool, shavings and felt. This material may be in loose or mat form and is also frequently used with a binder to form sound absorption composition board and the like. These materials produce sound attenuation by way of boundary friction which converts acoustic energy to thermal energy.

Two of the principal difficulties with materials of this nature are their lack of structural integrity and their poor heat resistance. Accordingly, in high velocity or high temperature applications or both, such as in jet exhaust silencing, these materials can only be used after elaborate measures have been taken to protect them from disintegration. In general, these protective measures dilute the effectiveness of the sound absorbent filler and, of course, also make for a more expensive structure.

Besides requiring special protective treatment, filler materials are a nuisance; they are dust collectors; they become saturated with exhaust products and they frequently settle under the effects of vibration. In many applications, the filler must be periodically replaced. The resultant material and maintenance costs can ultimately approach and sometimes exceed the original cost of the apparatus.

Attenuators have been built without absorbent fillers. For example, the Industrial Acoustics Company has marketed, under the trade name "Dura Stack," an all-plate silencer which has proved effective in many jet engine silencing applications.

The provision of a silencer of this general type, i.e., one which does not employ sound absorbent filler as the principal sound attenuating mechanism, is one of the principal objects of this invention, a further object being to provide performance improvement in such silencers such as better frequency coverage.

A still further object of the invention is to eliminate in whole or to a substantial degree, the need for complex structural shapes in such attenuators.

An additional object of the invention is to provide sound attenuating means and methods for producing the same which eliminate substantial dependence on boundary friction, diffusion, resonance effects, reflection phenomena and the like thus eliminating the need for highly complex and intricately shaped structures therein.

An additional object of the invention is to provide a simple, rapid and inexpensive method for producing improved stream silencing attenuators.

Further objects of the invention include the production of a heat and shock-resistant attenuator which may be used in extreme environments, an attenuator which has structural simplicity, is relatively inexpensive and durable and which provides relatively broad band rejection of noise.

These and other objects and advantages of the invention will be set forth in part hereinafter and in part will be obvious herefrom, or may be learned by practice with the invention, the same being realized and attained by means of the methods, steps, instrumentalities and combinations pointed out in the appended claims.

Briefly and generally the invention provides in stream silencing apparatus means for developing a plurality of jets and for modulating the velocity of these jets with the noise to be attenuated whereby acoustic energy is transformed into turbulence which is dissipated in turn as heat to thus provide attenuation of said noise. The invention further provides certain novel structural arrangements for implementing said modulation and certain metal working and processing methods for constructing said apparatus.

The invention consists in the novel parts, constructions, arrangements, methods, steps, combinations and improvements herein shown and described.

Serving as illustrations of exemplary embodiments of the invention are the drawings of which:

FIGURE 1 is a plan view in section along the line 1—1 of FIGURE 2 of a duct having a plurality of the modulating cells combined to form a silencer unit for jet engine exhaust silencing and the like;

FIGURE 2 is an elevation view from the rear, taken along the lines 2—2 of FIGURE 1 with a section cut away;

FIGURE 3 is a fragmentary elevation view taken along the lines 3—3 of FIGURE 1 and illustrating certain structural features of one of the semi-cells;

FIGURE 4 is a simplified plan view in section illustrating certain phenomena associated with the modulating cells;

FIGURE 5 is a fragmentary elevation view in section taken along the lines 5—5 of FIGURE 1 and illustrating one of the full modulating cells;

FIGURE 6 is a developed view of the full modulating cell shown in FIGURE 5 with certain parts omitted; and FIGURE 7 is an enlarged view showing a section of FIGURE 6.

GENERAL CONSTRUCTION

As illustrated in the figures, a rectangular duct having side walls 10, 11, a bottom wall 12 and a top wall 13 is provided. This duct may also be curvilinear, e.g., oval. The entrance to the duct is indicated by the arrow F (FIGURE 1) which also indicates stream flow into the duct. The exit of the duct is defined by the downstream edges E of the wall members.

Mounted in the duct are a plurality of modulating cells arranged in tandem banks. One bank 19 comprises side-by-side full cells 19a, 19b. Upstream therefrom is the second bank 20 comprising semi-cells 20a, 20b and laterally aligned therewith, full cell 20c. The cells in one bank are laterally offset with respect to the cells of the adjacent banks so that the maximum effectiveness of each cell can be realized. The number of cells per bank and the number of tandem banks is variable according to the needs of each installation.

The full cells having the appearance of splitter units, have respective symmetrical axes, and each such cell is shaped in cross-section somewhat like a wing foil or bullet. The leading edge 25 of each cell is smoothly curved and provided with groups of perforations 26, the size of which have been exaggerated in FIGURES 1 and 4 for illustration purposes. These, for convenience will be termed entrance ports. Thus, illustratively, there are five aligned groups of three entrance ports each along the leading edge of each full cell on one side of the cell axis (FIGURES 5 and 6) and six groups on the other side of this axis, four having three ports each and two having two ports each. The groups in one column are staggered with respect to the groups in the adjoining column. The number of groups and ports therein, like the number of cells per bank and number of banks are variable according to installation requirements provided that certain conditions noted below are properly established.

The sides 27 of each cell are spaced apart and parallel and are each provided with distributed perforations 28 (not shown in FIGURE 1 and exaggerated in the other figures except FIGURE 7). These for convenience will be termed modulation perforations. The sides 27 containing these perforations are canted inwardly at their trailing edges to form a tapered tail section 30 for each cell. The ends of each full cell are mounted in saddles 15 secured to the upper and lower duct walls 12 and 13 as by welding, the cells being secured in turn to the saddles as by bolting.

Installed in the interior of each full cell is a continuous corrugated septum member 31, the apices of which, as seen in FIGURES 2 and 5, alternately contact and are secured to the sides of the cell. The leading edge 31a of the member 31 is serrated to form a series of curvilinear sections which conform with the leading curved face of the respective cell. The number and size of the corrugations in member 31 are such that each corrugation is associated with and assigned to one group of entrance ports 26. This also may be seen in FIGURE 6 where the developed position of the member 31 relative to the cell is illustrated by the broken line. Moreover, the open area of each corrugation defines and circumscribes a group 16 of the side modulation perforations 28. Accordingly, each group of ports 26 is primarily in communication with a group of modulation perforations 28 on the side 27 closest to these ports and these are largely isolated from the other groups of ports and perforations. It may be seen then that the septum member 31 acts to divide each cell into a plurality of compartments or chambers.

The semi-cells 20a and 20b have a general appearance conforming to one half a full cell and are installed in and secured as by bolting to partial saddles 15' which are secured in turn as by welding to lower and upper wall members 12 and 13, respectively. The leading and trailing edge of each semi-cell is turned and formed as a tab which is secured to the side 10 or 11 of the duct as by bolting. The leading surface of each semi-cell includes entrance ports 26 arranged in vertically aligned groups of four while the sides 27 are provided like the full cells with sets of perforations 28. For providing substantial isolation between the groups of ports 26 and between the groups of perforations 28, and for providing communication between each group of entrance ports and the adjoining set of perforations, a plurality of septum members 40 are installed in each semi-cell (FIGURE 3). The leading edge of each septum 40 is curved in conformity with the curved leading surface of the semi-cell while the sides are upturned and secured respectively to the sides 10 or 11 and the side 27 of the enclosing cell as by bolting.

SYSTEM GEOMETRY AND OPERATION

The operation of the silencer commences with the entry of a noise bearing stream into the duct. This stream, e.g., a jet, steam or diesel exhaust or an air conditioning or ventilating stream, is split, as suggested in FIGURE 4, by the first bank of cells into a plurality of branch streams $F_1$, $F_2$ and these diverge in turn into further branches $F_3$, $F_4$, $F_5$ . . . , downstream as the subsequent banks of cells are encountered. Each branch stream flows between the contiguous perforated walls 27 of adjacent cells as indicated by the arrows in FIGURE 4.

Because of a pressure differential which exists between the leading edge 25 of each cell and the sides 27 thereof, and by virtue of ports 26 and modulation perforations 28, an additional flow, as indicated by the double headed arrows in FIGURE 4, occurs from the ports 26 to the modulation perforations 28 of the corresponding cell compartment. The velocity of this flow is greatly stepped up in the regions of perforations 28, rising above the critical value delineating laminar and turbulent flow. A plurality of jets is accordingly generated. In this jet region there is an interaction of the noise modulated jet component and the noise component passing through perforations 28 of the stream branches $F_1$, $F_2$, $F_3$. A marked increase in turbulence occurs resulting in the transformation of a considerable amount of acoustic energy into thermal energy thereby effecting considerable attenuation. This attenuation, unlike that provided by conventional diffusing screens and perforated plates, is greatest in the middle and upper bands of the frequency spectrum.

In developing this attenuating turbulence, certain conditions must be established and practices observed. In general, the means for providing the modulated jet flow must develop a pressure differential. In the illustrated embodiments this is accomplished by forming the leading edge of the cells so as to provide stagnation points. The pressure at these points will accordingly be more than the pressure along the sides 27 of each cell, thus providing the necessary pressure difference. The overall system for providing the modulated jet flow is, in effect, a low pass filter having a sufficiently high acoustic impedance to insure the achievement of the modulation phenomenon in the region of the perforations 28. Exemplary dimensional values for achieving the above conditions in the illustrated flow generating arrangement include entrance ports 26 having an open area of approximately 3% to 10% so as to insure sufficient volume or mass flow to obtain the necessary velocity in the region of perforations 28. The latter are dimensioned and distributed to provide an open area of from about 3% to about 5% which is the required range for the illustrated embodiment. Under these conditions, and for a typical exhaust application, the steady state component of velocity in the regions of the perforations 28 is from approximately 30 feet per second to approximately 50 feet per second. This velocity is modulated in turn by the noise components.

It is also desirable in order to achieve the proper modulation effects to make the impedance seen by the sound component in the region of perforations 28 substantially resistive. This is accomplished by dimensioning each cell compartment (with the aid of the septum member) such that the effective inductance of the air mass is tuned out by the equivalent capacity of each cell compartment.

It may be seen from the foregoing that while the cell arrangement, being a turbulence generator, is ostensibly a source of sound, it is in actuality an effective sound attenuator. It is also evident that the improved performance characteristics are achieved without sacrificing structural simplicity—each full cell is in essence a simple two-piece assembly. In these respects the use of septum 31 provides significant advantages. Additional simplification, particularly with respect to compactness, as well as important performance improvement, are achieved by virtue of the perforations 28 in the tapered sections 30. Besides functioning in the modulation action described above, these perforations provide means for developing a stabilizing flow in the regions of sections 30, thus permitting a blunt, short tail configuration with a large angle of taper, $s$, which in the illustrated embodiment is about 70°. In general $s$, may be substantially greater than 45°.

By way of providing an exemplary set of dimensional data to aid in practicing the invention, there is listed below under Table I certain dimensions of a silencer constructed in accordance with the invention. While horizontal operation has been referred to for convenience, the silencer may be operated at any angle, e.g. vertically.

Table I

[Note: Notations refer to FIGURES 4–7; all dimensions are in inches unless otherwise specified]

| | |
|---|---|
| Cell separation, $e$ (FIG. 4) | 7½–8 |
| Perf. dia., $d_1$ | ¼ |
| Port dia., $d_2$ | 1 |
| Perf. separation, $p_1$ | 1¼ |
| Perf. separation, $p_6$ | 2⅜ |
| Port separation, $p_2$ | 3¾ |
| Port separation, $p_5$ | 6½ |
| Cell width, $w_1$ | 12¾ |
| Cell compt. height: | |
| $h_1$ | 7¾ |
| $h_2$ | 20 |
| Total cell height, $h_3{}^1$ | 115¾ |
| Port location, $p_3$ | 7%16 |
| Port location, $p_4$ | 6¹¹⁄₁₆ |
| Cell dimension: | |
| $w_2$ | 4³⁄₁₆ |
| $w_3$ | 17⅝₁₆ |
| $w_4$ | 13¹⁄₃₂ |
| $w_5$ | 3¹¹⁄₁₆ |
| $w_6$ | 74⁹⁄₁₆ |
| Cell and septum material | ² ¼ |

¹ Variable in oval duct configurations.
² Plate steel.

PRODUCTION METHOD

Production of suppressors according to the invention are in essence accomplished by (1) forming each cell, as by bending, into the illustrated foil-like shape; (2) forming as by bending, the corrugated septum member; (3) inserting the latter in secure position into the former; (4) assembling the cells thus formed with the duct. In constructing a typical embodiment, the following steps are performed:

(1) Each cell body in planar form as shown in FIGURE 6 is provided with the perforations 26 and 28 as by punching; other perforations for fastening (not shown) are also provided in the plate.

(2) The plate is formed into the cell shape as, for example, by brake bending and rolling. One convenient procedure is to bend the terminal tabs of the trailing edge of the cell, then to form the nose and sides by rolling and finally to provide the trail taper by brake bending. The trailing tabs are secured as by bolting.

(3) The septum 31 is formed from a flat piece preferably by first cutting the leading serrated edge and then by corrugating the piece as by brake bending. Slots are also provided in the member 31 in the region of the apices thereof.

(4) The septum member is inserted into the cell body. For securing one to the other, T-shaped bolts inserted in the above-mentioned slots of the septum through mating slots in the cell body may be employed, the bolts being rotated 90° after insertion so that the heads thereof lie in and parallel with the V defined by the corrugations. Alternatively, the trailing section of the cell body temporarily may be sprung to provide access for securing bolts and nuts through aligned holes in the septum and cell body.

(5) The cells thus formed are then connected to the duct wall members by slipping the cells into saddles 15 before the trailing tabs thereof are bent into the tapered position (see FIG. 1) and by connecting the cells to the saddles as by bolting. Where greater rigidity is desired, the connecting bolts may pass completely through the cell body and through both sides of the saddle.

(6) The semi-cells are formed into the illustrated wing foil shape and are installed in a manner analogous to the foregoing except that a plurality of individual septa 40 are employed, these being secured to the cell body and duct walls as by bolting.

It may be seen from the foregoing that a rugged, durable and efficient all plate, turbulence type attenuator is realized according to the invention without the need for expensive materials or costly and time consuming processes. While exemplary arrangements have been shown, variations thereof, in accordance with the needs of particular installations, will occur to those skilled in the art. While absorptive type material relying on boundary friction is not required, the same may be used in combination with the attenuator of the invention to supplement the function thereof.

The invention in its broader aspects is not limited to the specific methods, mechanisms, compositions, combinations and improvements shown and described but departures may be made therefrom within the scope of the accompanying claims without departing from the principles of the invention and without sacrificing its chief advantages.

What is claimed is:

1. Apparatus for attenuating acoustic energy in a fluid stream comprising at least one cell structure including a leading surface and a side surface; means defining a first channel for said fluid stream, said cell structure being disposed within said first channel so that said fluid stream is directed toward said leading surface, and so that the major portion of said fluid stream flows along said side surface; said leading surface having at least one port therein; said side surface having at least one aperture therein; and means for defining a second substantially unobstructed channel coupling said port to said aperture and for bypassing a portion of said fluid stream via said second channel and thereafter injecting the same into said major portion of said fluid stream via said aperture at an increased velocity.

2. Apparatus according to claim 1 wherein said leading surface has a plurality of ports therein, and said side surface has a plurality of apertures therein coupled to said plurality of ports via said second channel, the total cross-section of said plurality of apertures being less than the total cross-section of said plurality of ports to thereby increase the velocity of that portion of the stream passing through said apertures.

3. Apparatus according to claim 1 wherein said leading surface includes a plurality of ports therein, said side surface includes a plurality of apertures therein, and wherein a septum member is disposed within said cell structure to form a plurality of said second channels each coupling a selected plurality of said ports to a selected plurality of said apertures.

4. Apparatus according to claim 3 wherein the total cross-section of a plurality of said ports is greater than the total cross-section of the plurality of apertures coupled thereto by one of said second channels.

5. Apparatus for attenuating acoustic energy in a fluid stream comprising at least one cell structure including a leading surface having a plurality of entrance ports therein; a pair of perforated, spaced apart, side members; means forming a substantially unobstructed fluid duct between said entrance ports and the perforations of said side members; and means defining a channel for said fluid stream so that said stream is directed toward said leading surface to create high pressure stagnation points in the vicinity of said entrance ports and modulated fluid jets at said perforations, and so that a major portion of said stream passes along the surfaces of said side members; the total cross section of said entrance ports being greater than the total cross section of said perforations of said side members coupled thereto by said fluid duct.

6. Apparatus according to claim 5 further comprising a perforated tail section interposed between the trailing edges of said side members, and means forming a fluid duct between said ports and the perforations in said tail section to create flow stabilizing jets.

7. Apparatus for attenuating sound such as that generated by jet engine exhausts, comprising means defining a channel for the jet engine exhausts; a plurality of spaced apart cell structures secured in said channel and exposed to the jet engine exhausts passing through said channel; each of said cell structures having a chamber therein and including a curved nose section, an intermediate body portion connected to the trailing edges of said nose section, and a tapered tail section connected to the trailing edges of said intermediate body portion; said nose section having a plurality of ports therein and being disposed within said channel so that stagnation points are established at said nose section; said intermediate body portion having perforations therein, the total cross section of said perforations being less than the total cross section of said plurality of ports coupled thereto via said chamber; whereby said perforations create a plurality of fluid jets directed into the exhaust stream passing along the surfaces of said intermediate body portion.

8. Apparatus according to claim 7 wherein said tapered tail section has perforations therein, the total cross section of said perforations in said tail section and in said intermediate body portion being less than the total cross section of said plurality of ports coupled thereto via said chamber, whereby said perforations in said tail section create flow stabilizing jets.

9. Apparatus according to claim 7 further comprising a corrugated septum member within said chamber to provide a plurality of fluid ducts therein, each of said ducts coupling a plurality of said perforations to a plurality of said ports, the total cross section of each of said plurality of perforations being less than the total cross section of said plurality of ports coupled thereto by means of one of said fluid ducts.

10. A method of producing sound attenuating apparatus of the type including at least one cell having entrance ports in the leading edge, perforations along the parallel sides and along a inwardly canted tail section, and having a septum member within the cell so that selected entrance ports communicate with perforations having a total cross section less than that of the associated entrance ports, comprising the steps of providing a first plurality of apertures in the vicinity of a center line passing across a flat sheet, and a second plurality of smaller apertures distributed over the remainder of the sheet; bending said sheet about said center line to provide a rounded leading edge whereby said first plurality of apertures become the entrance ports in the leading edge; bending the free edges of said sheet inwardly to form the perforated inwardly canted tail section while leaving parallel perforated side portions, thereby forming a wing-like cell; serrating one edge of a flat sheet having a width slightly greater than the width of said parallel side portions; corrugating said serrated sheet to form a septum member; inserting said septum member in said wing-like cell; and securing the apices of said septum member to said side portions.

11. The method in accordance with claim 10 further comprising forming a channel with spaced apart top and bottom walls; and securing the free ends of said wing-like cell between said top and bottom walls.

References Cited by the Examiner

UNITED STATES PATENTS

| 1,532,928 | 4/25 | O'Connor | 181—56 X |
| 2,035,923 | 3/36 | Scarritt | 181—44 |
| 2,054,703 | 9/36 | Little et al. | |
| 2,226,216 | 12/40 | Breese | 29—163.5 X |
| 2,826,261 | 3/58 | Eckel | 181—33.22 |
| 2,864,455 | 12/58 | Hirschorn | 181—33.22 |
| 2,916,101 | 12/59 | Naman | 181—46 X |
| 2,942,682 | 6/60 | Bergh et al. | 181—33.221 |

FOREIGN PATENTS

| 885,536 | 5/43 | France. |
| 653,544 | 5/51 | Great Britain. |
| 678,344 | 9/52 | Great Britain. |

LEO SMILOW, *Primary Examiner.*

LAURENCE V. EFNER, *Examiner.*